Figure 1:
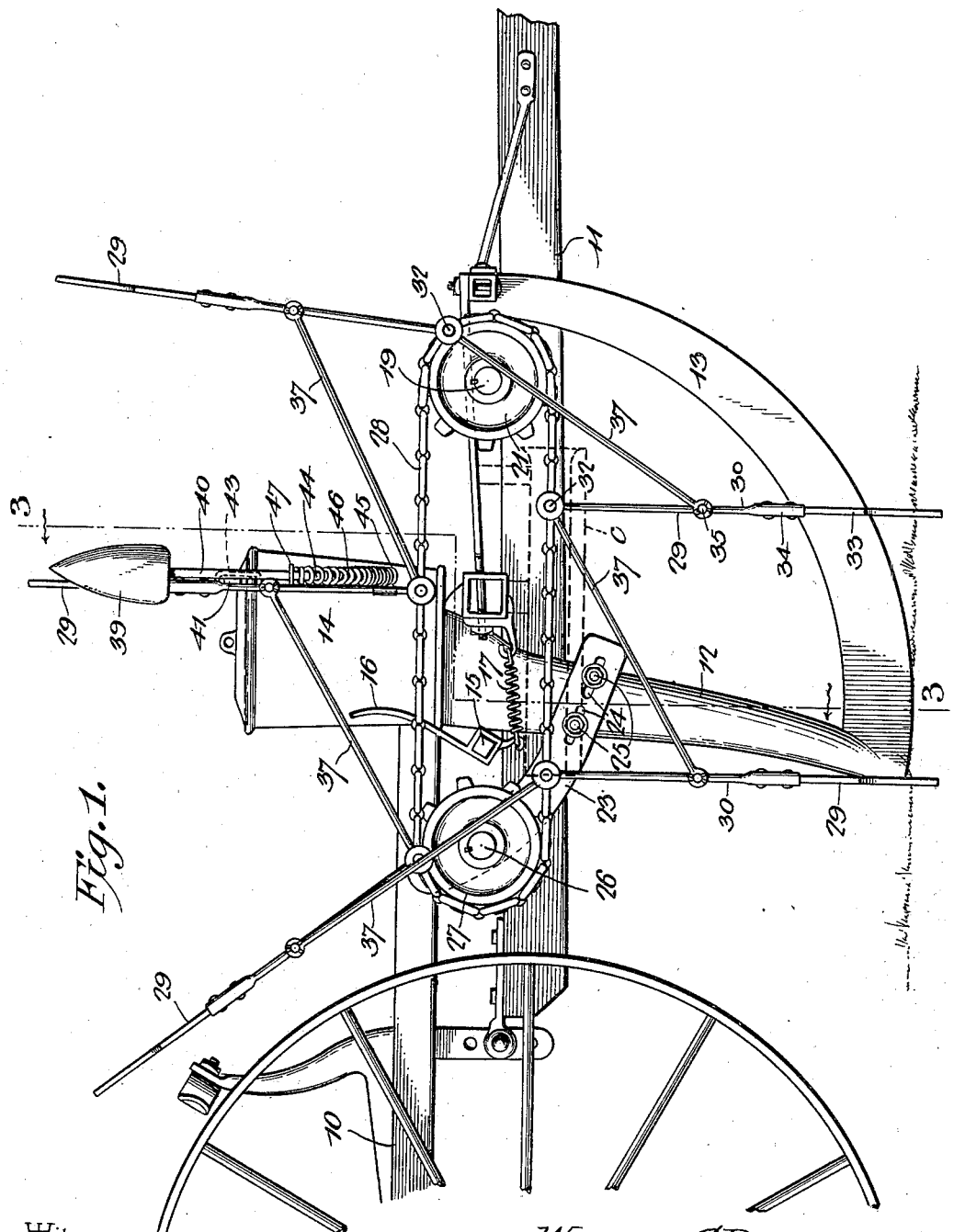

No. 668,440. Patented Feb. 19, 1901.
W. C. DUNCAN.
CHECK ROW CORN PLANTER.
(Application filed Oct. 6, 1900.)
(No Model.) 4 Sheets—Sheet 1.

Witnesses
Warren C. Duncan, Inventor
by C. A. Snow & Co.
Attys

THE NORRIS PETERS CO., PHOTO-LITHO., WASHINGTON, D. C.

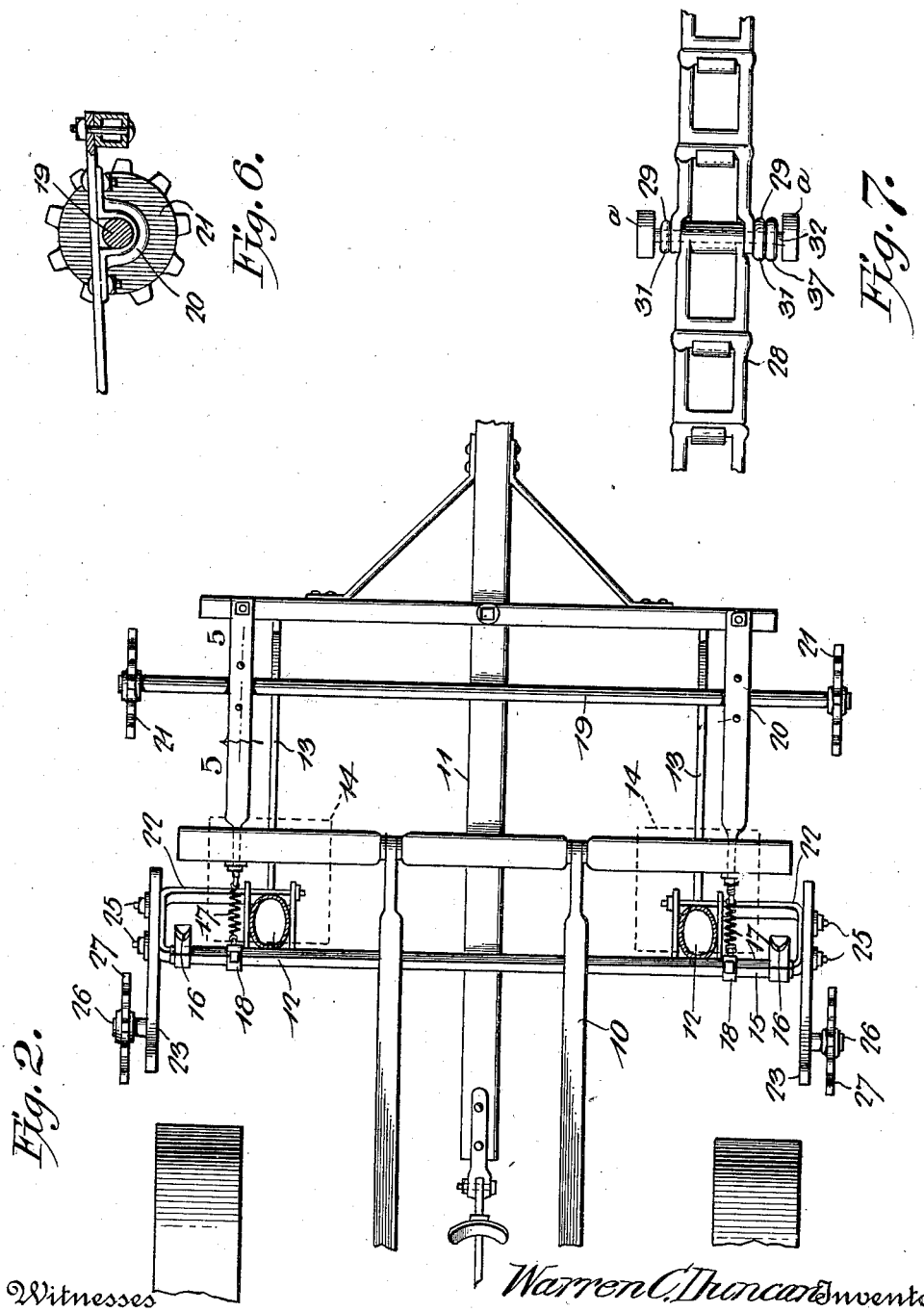

No. 668,440. Patented Feb. 19, 1901.
W. C. DUNCAN.
CHECK ROW CORN PLANTER.
(Application filed Oct. 6, 1900.)
(No Model.) 4 Sheets—Sheet 3.
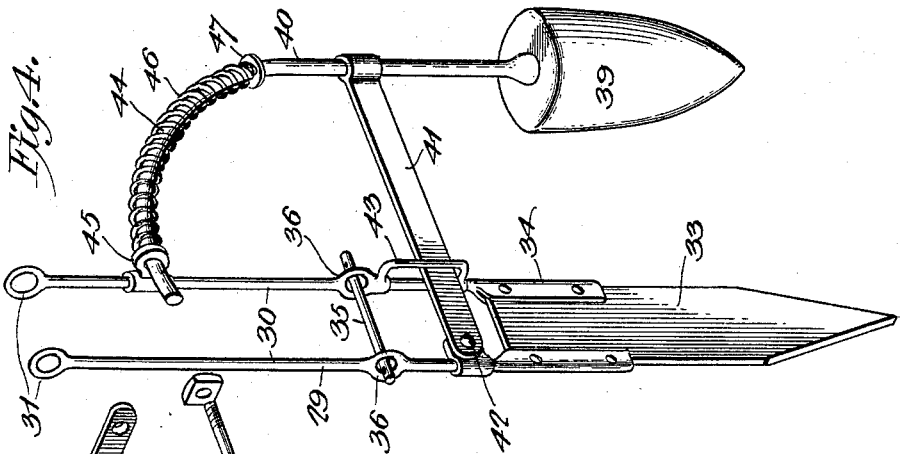
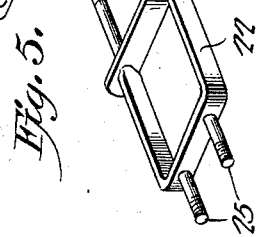
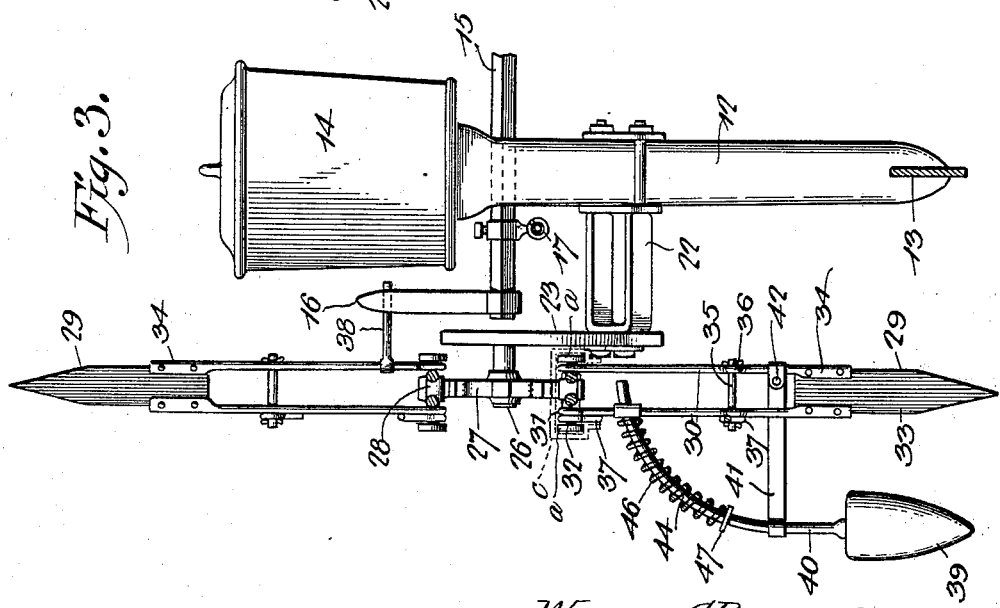
Witnesses
J. Frank Culverwell
J. W. Garner
Warren C. Duncan Inventor
by C. A. Snow & Co. Attorneys
THE NORRIS PETERS CO., PHOTO-LITHO., WASHINGTON, D. C.

No. 668,440. Patented Feb. 19, 1901.
W. C. DUNCAN.
CHECK ROW CORN PLANTER.
(Application filed Oct. 6, 1900.)
(No Model.) 4 Sheets—Sheet 4.
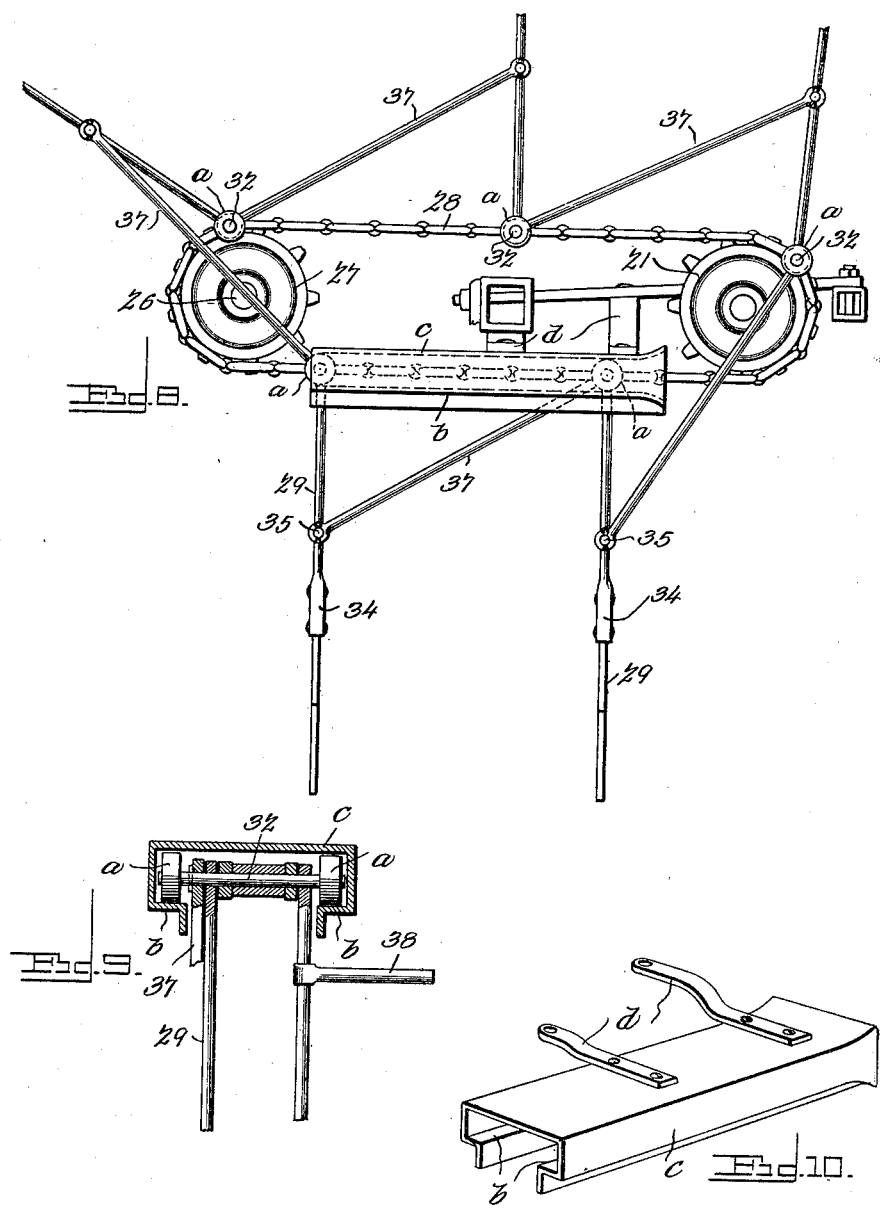
Witnesses
Warren C. Duncan, Inventor
by C. A. Snow & Co.
Attorneys

UNITED STATES PATENT OFFICE.

WARREN C. DUNCAN, OF RANDOLPH, NEBRASKA.

CHECK-ROW CORN-PLANTER.

SPECIFICATION forming part of Letters Patent No. 668,440, dated February 19, 1901.

Application filed October 6, 1900. Serial No. 32,252. (No model.)

*To all whom it may concern:*

Be it known that I, WARREN C. DUNCAN, a citizen of the United States, residing at Randolph, in the county of Cedar and State of Nebraska, have invented a new and useful Check-Row Corn-Planter, of which the following is a specification.

My invention is an improved check-row attachment for corn-planters, the object of my invention being to provide a light, cheap, simple, and efficient mechanism which is actuated by traction with the earth as the machine advances and operates the seed-dropping mechanism, so as to cause the seeds to be planted in hills at regular distances apart, and which is adapted to mark the hills, whereby the alinement thereof may be preserved and the seeds planted in check-rows.

My invention consists in the peculiar construction and combination of devices hereinafter fully set forth, and pointed out in the claims.

In the accompanying drawings, Figure 1 is a side elevation of a check-row corn-planter mechanism embodying my improvements, showing the same attached to a corn-planting machine. Fig. 2 is a top plan view of the same, partly in section. Fig. 3 is a transverse sectional view taken on the line 3 3 of Fig. 1. Fig. 4 is a detail perspective view of one of the traction-spurs and the marker connected thereto. Fig. 5 is a detail perspective view of one of the bracket-yokes for securing the wheel-supporting arm to the seed-spout. Fig. 6 is a detail elevation, partly in section, showing the bearing for one end of the connecting-shaft. Fig. 7 is a detail top plan view of a portion of one of the sprocket-chains, showing the tappet with which the same is provided. Figs. 8, 9, and 10 are detail views showing a covering-guide which is used in connection with the lower lead of each endless traveling sprocket-chain to stiffen the latter and insure the engagement of the traction-spurs with the ground.

The corn-planting machine 10 shown in the drawings is of one of the well-known forms, 11 being the front or runner frame thereof, to which the seed-spouts 12, runners 13, and hoppers 14 are attached in the usual manner. The seed-dropping mechanism may be of any preferred form and is not here shown; but for illustrative purposes I have indicated an operating-shaft 15, which actuates the seed-dropping mechanism and which is provided with tappet-arms 16 at its ends and springs 17, the coaction of said tappet-arms and said springs being such as to rock the shaft 15 in its bearings 18 for the purpose of causing the said shaft to actuate the seed-droppers.

In the embodiment of my invention I provide a shaft 19, which extends transversely across the frame 11 and is journaled in bearings 20, provided therefor, said shaft being the connecting-shaft between the check-row attachments on opposite sides of the frame 11 and being provided at its ends with sprocket-wheels 21.

Bracket-yokes 22 are secured on the seed-spouts 12, as shown, and project beyond the outer sides of said seed-spouts, and on the outer projecting ends of said bracket-yokes are secured rearwardly and upwardly curved supporting-arms 23, the latter at their lower front portions being provided with adjusting-slots 24, which are engaged by bolt-studs 25, with which the bracket-yokes 22 are provided, as shown. The said curved supporting-arms 23 are provided with outwardly-extending horizontally-disposed spindles 26, on which are mounted sprocket-wheels 27, the latter being in line longitudinally with the sprocket-wheels 21 and connected thereto by endless sprocket-chains 28.

Pivotally connected to each sprocket-chain 28, at suitable regular distances apart, are a series of traction-spurs 29. Each of said traction-spurs comprises a pair of rods 30, the inner ends of which are pivotally connected, as at 31, to bolts or spurs 32, which project laterally beyond the sides of the chain 28, and a plate 33, to opposite sides of which the outer ends of said rods are attached, as at 34, said plate 33 projecting beyond the outer ends of the said rods and being sharpened, as shown, and thereby adapted to readily enter the earth. A pivotal rod 35 extends transversely through eyes or openings 36, with which the rods 30 are provided, and to one end of said pivotal rod is secured the outer end of a brace-rod 37, the inner ends of said brace-rod being pivotally connected on the bolt or spurs 32, which forms the pivotal connection between the chain and the next traction-spur in series. The length of the traction-spurs is such that the points thereof will successively engage the ground as the machine is drawn forward, and thereby actuate the sprocket-chains, as will be readily understood, the brace-rods 37 serving to maintain the traction-spurs on the lower leads of the endless chains at right angles thereto, as shown. One or more of the traction-spurs on each of the endless chains is provided on its inner side with a projecting tappet 38. Said tappets engage the tappet-arm 16 of rock-shaft 15, and hence actuate the latter and cause the same to operate the seed-dropping mechanism, as will be readily understood. Said tappets 38 are so disposed on said spurs that they engage and actuate the tappet-arms 16 of rock-shaft 15 at the instant that one of the traction-spurs of each endless chain is abreast of the lower end of the proximate seed-tube. To each of said traction-spurs, which thus coincide with the seed-tubes at the instant that the seed-dropping mechanisms are operated, is attached a marker 39. Said markers are alike in construction and operation, and I will now proceed to describe one of them.

The marker 39 is attached to one end of a rod 40, which is carried by an arm 41, which arm is pivotally connected, as at 42, at its inner end to one of the rods 30 and operates in a guide 43, with which the other rod 30 is provided. The rod 40 has a curved extension 44 at the end opposite that to which the marker 39 is attached, said curved extension being concentric with the pivot 42 and operating in a guide, ear, or lug 45 attached to the outer rod 30. A coiled extensile spring 46 on the curved portion of the rod 40 bears between the said ear or lug 45 and a suitable offset 47, with which the rod 40 is provided, said spring serving to normally maintain the marker in the position relative to the traction-spur shown in Figs. 3 and 4 of the drawings, and hence in position to engage and make a mark or depression in the ground, which will indicate the location of a hill in which the seeds are planted. In the event that the marker should encounter a stone or other obstruction the pivotal connection between the latter and the traction-spur to which it is attached and the spring 46 enable the marker to yield by turning on its pivot, and thereby the same is prevented from being broken or injured.

It will be understood that as the shaft 19 connects the check-row attachments disposed on opposite sides of the corn-planter said check-row attachments are caused to operate in unison under all conditions, hence securing uniformity in the operation of the marking and seed-dropping mechanisms, and hence rendering said attachments efficient in securing the planting of the corn in check-rows.

By means of the adjusting-slots 24 with which the supporting-arms 23 are provided on the stud-bolts 25, which operate in said adjusting-slots, said supporting-arms 23 may be adjusted as may be required to secure the requisite tension of the endless chain 28.

It will be understood that my improved check-row attachments are adapted to be used efficiently on corn-planters of various styles.

The pivotal bolts 32 of the chains 28 have their ends extended beyond the sides of the chains to form journals for antifriction-rollers $a$, which travel on ways $b$, formed in covering-guides $c$, in which the lower leads of the chains 28 travel, the said covering-guides being secured on the sides of the frame of the planter by means of arms $d$, which are bolted to any appropriate portions of the planter-frame. The function of these covering-guides is to stiffen the lower leads of the chains, and thereby insure the engagement of the points of the traction-spurs with the soil. The said covering-guides are shown in Figs. 8, 9, and 10 and the positions thereof indicated in dotted lines in Figs. 1 and 3. For the sake of clearness of illustration of other parts of the invention said covering-guides are omitted from the other figures of the drawings.

Having thus described my invention, I claim—

1. In a check-row corn-planter, the combination of an endless traveling element, supports therefor, traction-spurs attached to said endless traveling element and a yieldable marker carried by one of said spurs, on one side thereof, substantially as described.

2. In a check-row corn-planter, the combination of an endless traveling element, supports therefor, traction-spurs attached to said endless traveling element and a spring-pressed marker pivotally connected to one of said spurs, substantially as described.

3. In a check-row corn-planter, the combination with an endless traveling chain and supporting-wheels therefor, of the traction-spurs pivotally connected to said chain and comprising the pairs of rods, plates connecting said rods at their outer ends and the brace-rods, the latter connected pivotally to the spurs and the chain, substantially as described.

4. In a traction mechanism for check-row corn-planters, in combination with an endless traveling element a series of traction-spurs projecting therefrom, an arm pivotally connected to one of said spurs, a rod carried by said arm, a marker attached to said rod, and a spring to restrain the marker normally from moving inward on its pivot, substantially as described.

5. In a planter, the combination of a frame, a seed-tube, a rock-shaft to actuate the seed-dropping mechanism and having a tappet-arm, a sprocket-wheel carried on one side of the frame, a supporting-arm secured to the said seed-tube, a sprocket-wheel carried by said supporting-arm, an endless chain connecting said sprocket-wheels, traction-spurs pivotally connected to said endless chain and rods pivotally connected to said chain and to said spurs, said chain having a tappet projecting from one side thereof to engage and operate the tappet on the rock-shaft, substantially as described.

In testimony that I claim the foregoing as my own I have hereto affixed my signature in the presence of two witnesses.

WARREN C. DUNCAN.

Witnesses:
P. PILL,
WILL WOOLVERTON.